(12) United States Patent
Cho et al.

(10) Patent No.: US 12,713,117 B2
(45) Date of Patent: Aug. 18, 2026

(54) ANTI FOG HOUSING FOR AUTOMOTIVE SENSOR

(71) Applicant: GM Global Technology Operations LLC, Detroit, MI (US)

(72) Inventors: Junil Cho, Incheon (KR); Minsu Lee, Gyeonggi-do (KR); Minhyung Kang, Buncheon-si (KR)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 18/799,471

(22) Filed: Aug. 9, 2024

(65) Prior Publication Data

US 2026/0046499 A1 Feb. 12, 2026

(51) Int. Cl.

| | |
|---|---|
| ***H04N 23/52*** | (2023.01) |
| ***G01S 7/40*** | (2006.01) |
| ***G01S 13/931*** | (2020.01) |
| ***H04N 23/51*** | (2023.01) |

(52) U.S. Cl.

CPC ........... *H04N 23/52* (2023.01); *G01S 7/4047* (2021.05); *G01S 13/931* (2013.01); *H04N 23/51* (2023.01)

(58) Field of Classification Search

CPC ...... H04N 23/52; H04N 23/51; G01S 7/4047; G01S 13/931

See application file for complete search history.

(56) References Cited

U.S. PATENT DOCUMENTS

| | | | | |
|---|---|---|---|---|
| 3,584,785 | A * | 6/1971 | Matulich | F24F 11/41 236/80 R |
| 8,563,898 | B1 * | 10/2013 | Wright | B60Q 1/0017 219/202 |
| 11,903,102 | B1 * | 2/2024 | Lassar | G01S 7/4812 |
| 2003/0091089 | A1 * | 5/2003 | Krausse | G02B 7/1815 374/16 |
| 2009/0213208 | A1 * | 8/2009 | Glatt | G08B 13/19628 348/36 |

(Continued)

FOREIGN PATENT DOCUMENTS

| | | | | |
|---|---|---|---|---|
| CN | 215526271 | U * | 1/2022 | |
| CN | 114877289 | A * | 8/2022 | F21S 45/50 |
| DE | 102020000291 | A1 | 9/2020 | |

OTHER PUBLICATIONS

German Office Action for German Application No. 102024128650.4; dated May 9, 2025; 6 pages.

*Primary Examiner* — Michael Lee
(74) *Attorney, Agent, or Firm* — CANTOR COLBURN LLP

(57) ABSTRACT

A vehicle vision sensor system includes at least one vision sensor having a housing defining a void and a sensing element disposed within the void. A voltage controlled heating element is wrapped around the housing. A local temperature and humidity sensor is disposed proximate the housing and is configured to sense a temperature and relative humidity within the void. A controller is in communication with the local temperature and humidity sensor and an outside air temperature sensor. The controller includes a memory storing instructions for causing the controller to perform a process of identifying a dew point within the void, comparing a temperature of the void to the dew point and supplying a voltage to the heating element in response to the temperature of the void being below the dew point.

20 Claims, 4 Drawing Sheets

(56) References Cited

U.S. PATENT DOCUMENTS

| | | | |
|---|---|---|---|
| 2019/0377064 | A1* | 12/2019 | Scheske .................. G01S 7/497 |
| 2020/0391698 | A1 | 12/2020 | Fukuda et al. |
| 2022/0046760 | A1 | 2/2022 | Adachi et al. |
| 2023/0060268 | A1 | 3/2023 | Sato et al. |

* cited by examiner

ANTI FOG HOUSING FOR AUTOMOTIVE SENSOR

INTRODUCTION

The subject disclosure relates to automotive sensor housings, and more particularly to a housing including an anti-fog feature.

Vehicle vision and object detection systems utilize a network of sensors distributed about the vehicle to detect objects and features extrinsic to the vehicle, as well as positions of the objects and features relative to the vehicle. These detections are interpreted by a controller and the interpretation is provided to other systems within the vehicle, allowing for the systems to respond to the objects as warranted.

Typically, such sensors are encased in a housing to protect the sensor from environmental impacts such as gravel, road debris, etc. In some cases, when a temperature and humidity within the sensor housing is below a dew point, fog and condensation may form within the housing and surround the sensor. The fog and condensation can, in turn, decrease the accuracy and/or reliability of the sensor outputs.

As such, it is desirable to provide sensor housings that are able to decrease or eliminate fog and condensation within a sensor housing.

SUMMARY

In one exemplary embodiment vehicle vision sensor system includes at least one vision sensor having a housing defining a void and a sensing element disposed within the void. A voltage controlled heating element is wrapped around the housing. A local temperature and humidity sensor is disposed proximate the housing and is configured to sense a temperature and relative humidity within the void. A controller is in communication with the local temperature and humidity sensor and an outside air temperature sensor. The controller includes a memory storing instructions for causing the controller to perform a process of identifying a dew point within the void, comparing a temperature of the void to the dew point and supplying a voltage to the voltage controlled heating element in response to the temperature of the void being below the dew point.

In addition to one or more of the features described herein the at least one vision sensor is at least one of a light ranging and detection (LiDAR) sensor, a radio ranging and detection (RADAR) sensor, and a camera.

In addition to one or more of the features described herein the voltage controlled heating element is a resistive heating element wound around the housing.

In addition to one or more of the features described herein the voltage controlled heating element is not in direct contact with the sensing element.

In addition to one or more of the features described herein comparing a temperature of the void to the dew point and supplying the voltage to the voltage controlled heating element in response to the temperature of the void being below the dew point comprises identifying a difference between a dew point of the void and a temperature of the void and determining a magnitude of the voltage based on the difference.

In addition to one or more of the features described herein the magnitude of the voltage is determined using a look up table stored in the controller.

In addition to one or more of the features described herein the vehicle vision system further includes at least one display in communication with the controller and configured to display a condensation reduction system status of the at least one vision sensor.

In addition to one or more of the features described herein the at least one vision sensor comprises a plurality of vision sensors, each sensor in the plurality of vision sensors including a corresponding sensing element disposed within the void, a corresponding voltage controlled heating element wrapped around the corresponding housing, a and a corresponding local temperature and humidity sensor disposed proximate the housing and configured to sense a temperature and relative humidity within the void.

In addition to one or more of the features described herein the controller is configured to control each vision sensor in the at least one vision sensor independently.

In another exemplary embodiment a method for preventing condensation within a vehicle sensor includes comparing a measured internal temperature of the vehicle sensor to a dew point of the vehicle sensor and providing a voltage to a voltage controlled heating element of the vehicle sensor in response to an internal temperature of the vehicle sensor being less than the dew point of the vehicle sensor.

In addition to one or more of the features described herein, the method further includes identifying the dew point of the vehicle sensor using one of a temperature and humidity sensor disposed immediately adjacent to the vehicle sensor and a temperature and humidity sensor disposed on the vehicle sensor.

In addition to one or more of the features described herein the voltage controlled heating element is a resistive heating wire wound around a housing of the vehicle sensor.

In addition to one or more of the features described herein providing the voltage to the voltage controlled heating element comprises determining a magnitude of a difference between the dew point and the measured internal temperature of the vehicle sensor and setting a magnitude of the voltage based on the magnitude of the difference.

In addition to one or more of the features described herein the magnitude of the voltage is set using a look up table correlating the magnitude of the voltage with a magnitude of the difference.

In addition to one or more of the features described herein the vehicle sensor is at least one of a light ranging and detection (LiDAR) sensor, a radio ranging and detection (RADAR) sensor, and a camera.

In addition to one or more of the features described herein the voltage controlled heating element is not in direct contact with the vehicle sensor.

In addition to one or more of the features described herein, the method further includes displaying a condensation reduction system status of the vehicle sensor, wherein the condensation reduction system status includes an internal temperature of the vehicle sensor.

In addition to one or more of the features described herein, the method further includes comparing a measured internal temperature of a plurality of vehicle sensors to corresponding dew points in a plurality of dew points and supplying a voltage to corresponding heating element in response to a magnitude of a difference between each temperature and each corresponding dew point.

In addition to one or more of the features described herein each vehicle sensor in the plurality of vehicle sensors is controlled independently.

In another exemplary embodiment a vehicle including a vision system. The vision system includes a plurality of vision sensors disposed about a vehicle. Each vision sensor in the plurality of vision sensors is in communication with a controller. At least one vision sensor of the plurality of vision sensors has a housing defining a void and a sensing element disposed within the void. A voltage controlled heating element is wrapped around the housing. A local temperature and humidity sensor is disposed proximate the housing and configured to sense a temperature and relative humidity within the void. The controller is in communication with the local temperature and humidity sensor and an outside air temperature sensor. The controller includes a memory storing instructions for causing the controller to perform a process of identifying a dew point within the void, comparing a temperature of the void to the dew point and supplying a voltage to the voltage controlled heating element in response to the temperature of the void being below the dew point.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
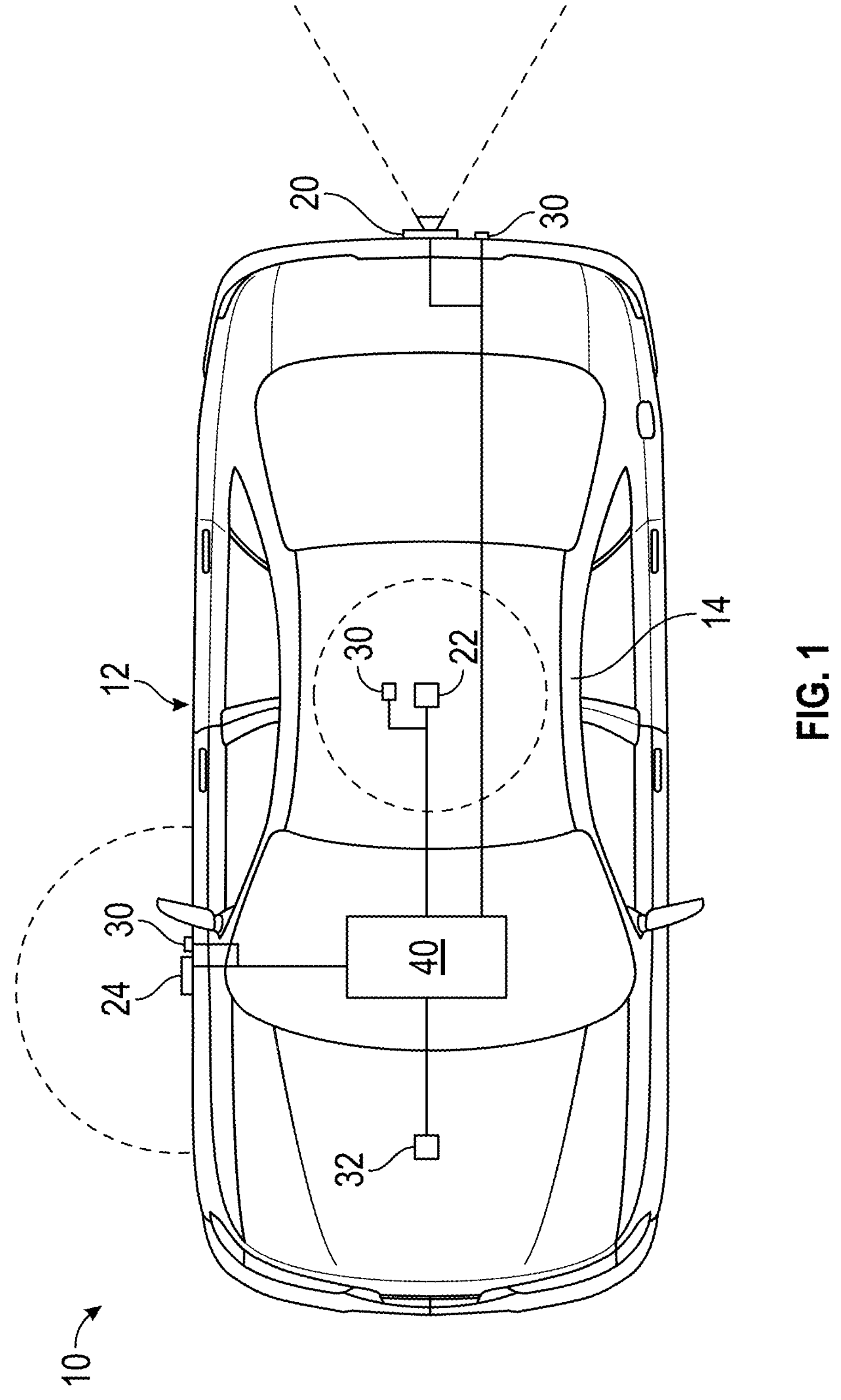
FIG. 1 is a schematic representation of a vehicle.

The following description is merely exemplary in nature and is not intended to limit the present disclosure, its application or uses. It should be understood that throughout the drawings, corresponding reference numerals indicate like or corresponding parts and features.

In accordance with an exemplary embodiment methods, devices and systems are provided for implementing a condensation removal feature within a sensor housing. The general arrangement includes a resistive heating element disposed about the sensor housing and a local temperature and humidity sensor disposed immediately adjacent to or on the sensor housing. The local temperature and humidity sensor detects a relative humidity within the sensor housing. As used herein "immediately adjacent to" refers to a sensor positioned close enough to the housing that the sensor output and the temperature and humidity of the housing are the same within the sensor's margin of error. In one example, this can be within two centimeters (cm) of the housing.

A controller within the vehicle monitors the relative humidity at the housing using the local temperature and humidity sensor. Based on the measured relative humidity, a known outside air temperature, and a dew point look up table, the controller provides a voltage to the resistive heating element, thereby raising the temperature of the housing above the dew point and preventing condensation from forming within the housing. By using a local temperature and humidity sensor the exact local relative humidity of the corresponding vision sensor can be determined and utilized, ensuring that the housing is heated sufficiently to prevent condensation without overheating the housing.

Embodiments described herein present numerous advantages and technical effects. Included among the advantages and technical effects is the reduction of condensation within the vehicle vision system sensors, as well as localized control allowing each vision system sensor to receive distinct magnitudes of resistive heating.

The embodiments are not limited to use with any specific vehicle and may be applicable to various contexts. For example, the localized monitoring and heating may be applied to any similar sensor configuration and is not limited to vision system sensors. Furthermore, in alternative examples the localized monitoring and heating may be utilized in any number of other vehicle types including unmanned vehicles, industrial vehicles, commercial vehicles, and the like.

Illustrated in FIG. 1, a vehicle 10 includes a body 12 and a passenger compartment 14. Disposed about the vehicle 10 are multiple vision system sensors including a camera 20, a light ranging and detection (LiDAR) sensor 22 and a radio detection and ranging (radar) sensor 24. Immediately adjacent to, or disposed on, each of the sensors 20, 22, 24 is a corresponding local humidity and temperature sensor 30 configured to detect relative humidity within a housing of the sensor 20, 22, 24. A practical vehicle 10 may include more sensors 20, 22, 24 of each type, with the sensors 20, 22, 24 distributed about the vehicle body 12 as needed to implement the vision systems for the vehicle 10. The anti condensation structures and processes described herein can be applied equally to any or all of such sensors 20, 22, 24 depending on their susceptibility to condensation.

In addition, an outside air temperature sensor 32 is disposed on the vehicle 10. The outside air temperature sensor 32 detects the general environmental conditions surrounding the vehicle 10 and is disposed at an ideal location on the vehicle 10 to achieve this sensing. The specific location of the outside air temperature sensor 32 depends on the structure of the vehicle 10 and can be determined according to ordinary practices in the art, depending on the specific structure of the vehicle 10.

Each of the vision system sensors 20, 22, 24, the corresponding local humidity and temperature sensors 30, and the outside air temperature sensor 32 are in communication with a controller 40. The controller 40 is, in one example, a dedicated condensation prevention controller. In alternative examples, the controller 40 can be a general controller including subroutines for operating a condensation prevention process, multiple distributed controllers in communication with each other and configured to operate cooperatively, or any similar control configuration.

Figure 2:
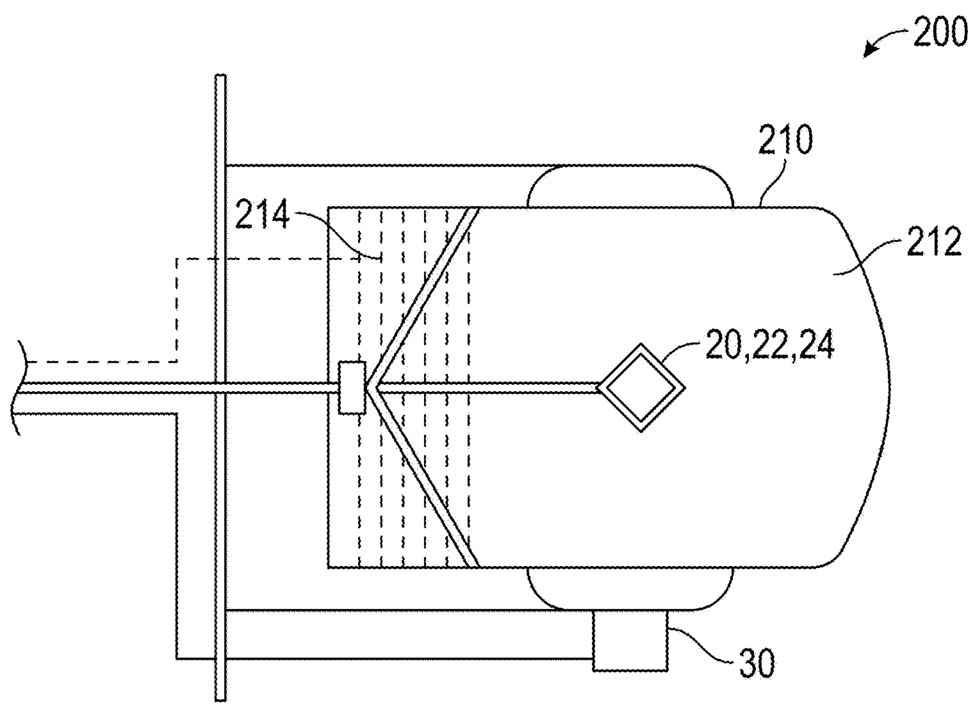
FIG. 2 is a schematic representation of a sensor housing.

With continued reference to FIG. 1, FIG. 2 illustrates an example sensor housing 200 configuration containing one of the sensors 20, 22, 24. A housing body 210 defines an open void 212 in which the sensor 20, 22, 24 is situated. One or more coils of a resistive heater 214 is wrapped around the housing body 210. By winding the resistive heater coils 214 around the housing 200, the resistive heater 214 can heat the volume in the open void 212 without directly contacting the sensor 20, 22, 24 The local humidity and temperature sensor 30 is mounted directly to the housing body 210 and is configured to sense the relative humidity within the void 212.

The readings from the sensor 20, 22, 24 and the local humidity and temperature sensor 30 are provided to the controller 40 (FIG. 1). In addition, the resistive heater 214 is connected to a controller output, or another power source controlled by the controller 40 such that the controller 40 regulates the voltage applied to the resistive heater 40. When voltage is applied to the resistive heater 214, the resistive heater 214 generates heat, with the amount of heat generated being proportional to the voltage applied to the resistive heater 214 according to a known ratio.

A dew point within a volume, such as the void 212, is a temperature below which the air in the volume becomes saturated with water content. The particular temperature is dependent on the relative humidity of the volume and the temperature of the air surrounding the volume 212 (the outside air temperature). While other factors remain constant if the temperature of the volume 212 is increased, the relative humidity decreases, and the dew point is raised. This principle operates according to known equations. Using this knowledge, and with the data provided by the outside air temperature sensor 32 and the local temperature and humidity sensor 30, the controller 40 can determine how much heat is needed to be generated by the resistive heater 214 to raise the housing 200 above the dew point thereby preventing fog or condensation from developing within the housing 200.

Figure 3:
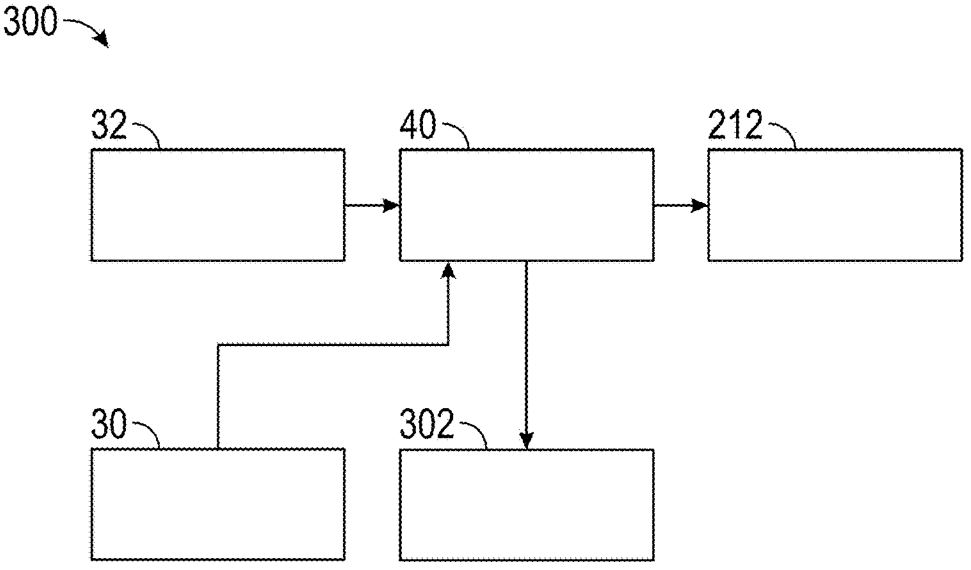
FIG. 3 is an exemplary control schematic of a single sensor.
Figure 4:
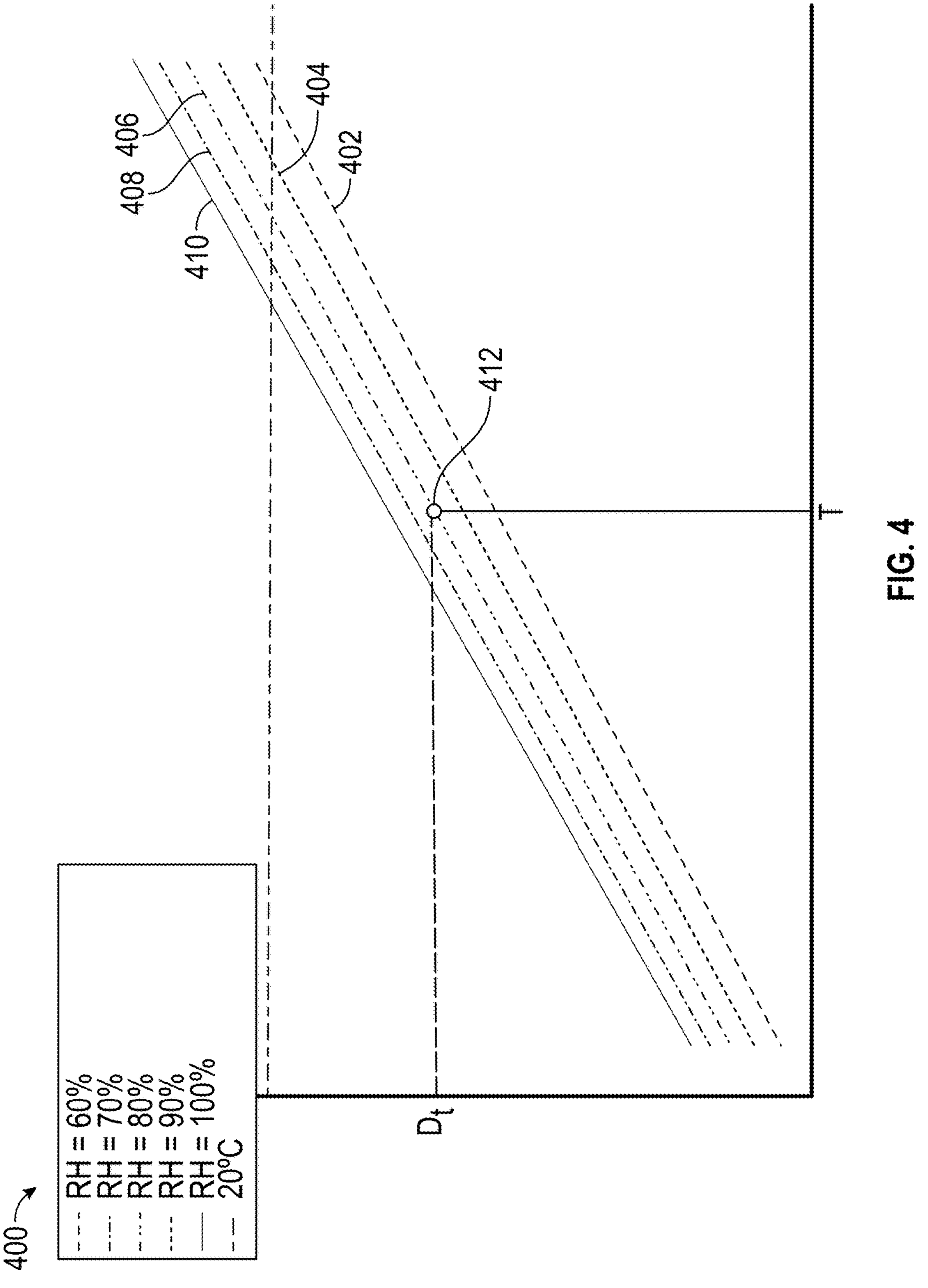
FIG. 4 is a chart illustrating a dew point at multiple humidity levels and multiple external temperatures.
Figure 5:
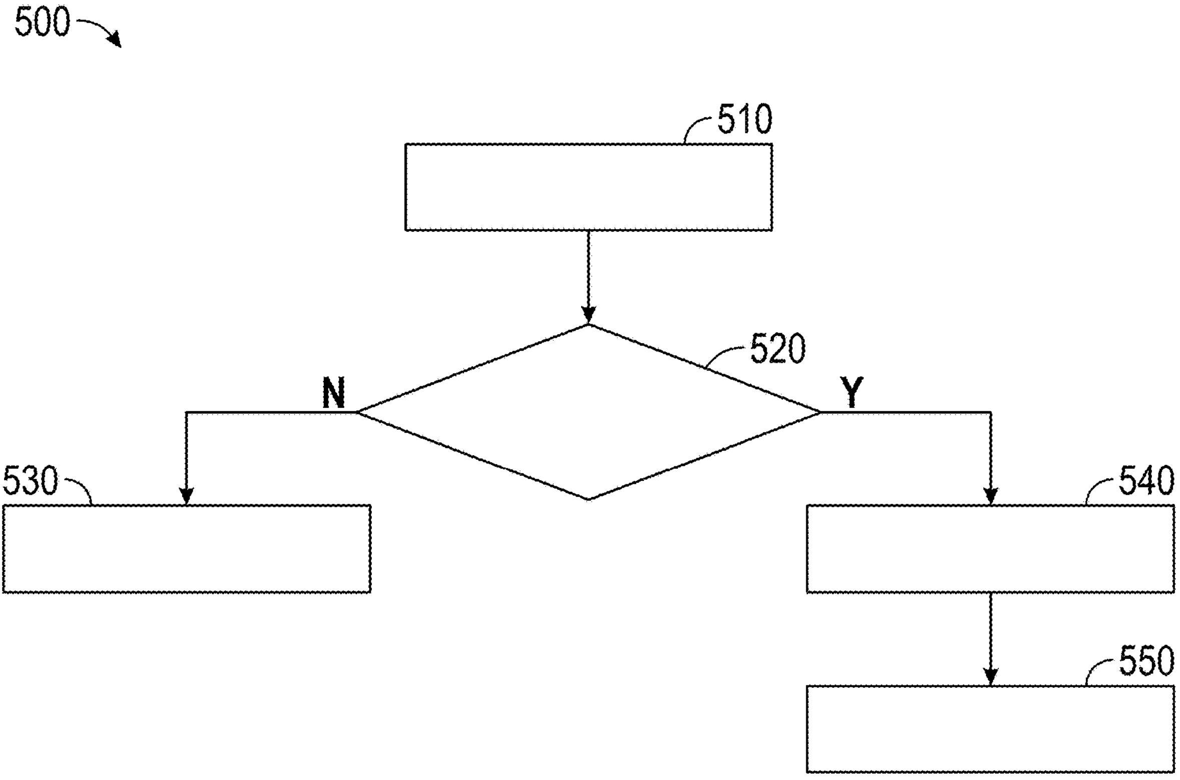
FIG. 5 is an automatic process for operating a resistive heater.

With continued reference to FIGS. 1 and 2, FIG. 3 illustrates a control scheme 300 for operating the anti-condensation systems described in FIGS. 1 and 2 and FIG. 4 illustrates a dew point look up table 400 stored within the controller 40. The controller 40 receives the outside air temperature from the outside air temperature sensor 32 and the relative humidity within the housing 200 of the vision sensor 20, 22, 24 from the local humidity and temperature sensor 30.

Using this information, the controller 40 consults the dew point look up table 400 to identify the precise dew point of the volume 212. The dew point look up table 400 includes multiple reference curves 402, 404, 406, 408, 410, with each reference curve 402, 404, 406, 408, 410 corresponding to a different relative humidity. In the illustrated example, the dew point look up table includes a curve at 60% relative humidity (curve 402), at 70% relative humidity (curve 404), at 80% relative humidity (curve 406), at 90% relative humidity (curve 408) and at 100% relative humidity (curve 410). In a practical example, more curves are included in the look up table 400, however they are omitted from illustration for ease of visualization.

By way of example, when the outside air temperature, as determined by the outside air temperature sensor 32 is T, and the relative humidity of the sensor 20, 22, 24 is 80% (curve 406), the dew point Dt can be determined by identifying the intersection of curve 406 and outside temperature T at a point 412. The point 412 corresponds to a dew point Dt.

After determining the dew point Dt, the controller 40 determines a temperature increase required to raise the temperature of the volume 212 to just above the dew point Dt and provides a corresponding voltage to the resistive heater 214 to generate the required heat. In some example configurations, the vehicle 10 may include a display 302, or an option to include a menu within an existing display 302, providing the vehicle operator a display of the dew point and heating operations determined by the controller 40.

With continued reference to FIGS. 1-4, FIG. 5 illustrates an automatic process 500 for operating the resistive heater 214. Initially the dew point (Dt) is identified via consulting the table 400 in an identify dew point step 510. After identifying the dew point Dt, the controller 40 determines the internal temperature of the housing 210 using the local temperature and humidity sensor 30 and compares the internal temperature to the identified dew point Dt in an is sensor temperature below Dt check 520. When the identified temperature is not below the dew point Dt, no heating is warranted, and no voltage is applied to the resistive heater 214 in a no heating step 530.

When the sensor temperature is below the dew point, the controller 40 identifies a difference between the measured temperature and the dew point Dt in an identify difference step 540. The difference is used to consult Table 1:

| Difference in degrees C. | Voltage (V) |
|---|---|
| Less than 2 C. | 5 V |
| Greater than or equal to 2 C. and less than 5 C. | 7.5 V |
| Greater than or equal to 5 C. and less than 10 C. | 10 V |

The voltage value corresponding to the difference as identified in Table 1 is then applied to the resistive heater 214 in an apply corresponding voltage step 550. The particular values identified in table 1 are applicable to one example embodiment. It is appreciated that alternative embodiments may utilize alternate values for each entry and/or have additional entries depending on the level of control able to be exerted over the voltage provided to the resistive heater 214.

This process 500 is iterated in real time, allowing for the temperature of the sensor 20, 22, 24 to be actively controlled, and ensure that the temperature of the sensor 20, 22, 24 is maintained above the dew point Dt throughout operation of the vehicle 10.

By incorporating the local relative humidity sensor 30 and determining the dew point based on the local relative humidity of the sensor 20, 22, 24, the anti-condensation system prevents fog, condensation and moisture within the volume 212 of the sensor housing 200, thereby preventing degradation of the sensor outputs improving visibility through the sensors and eliminating the need for manual control of sensor defog systems.

While described herein using a resistive heater 214, it is appreciated that the systems and processes could be modified to operate using any other heater type controlled by a fixed voltage and the process is not limited to resistive heaters 214.

In some alternative examples, the vehicle 10 may include a manual control interface allowing the vehicle 10 operator to manually engage or disengage the anti fog systems The terms "a" and "an" do not denote a limitation of quantity, but rather denote the presence of at least one of the referenced item. The term "or" means "and/or" unless clearly indicated otherwise by context. Reference throughout the specification to "an aspect", means that a particular element (e.g., feature, structure, step, or characteristic) described in connection with the aspect is included in at least one aspect described herein, and may or may not be present in other aspects. In addition, it is to be understood that the described elements may be combined in any suitable manner in the various aspects.

When an element such as a layer, film, region, or substrate is referred to as being "on" another element, it can be directly on the other element or intervening elements may also be present. In contrast, when an element is referred to as being "directly on" another element, there are no intervening elements present.

Unless specified to the contrary herein, all test standards are the most recent standard in effect as of the filing date of this application, or, if priority is claimed, the filing date of the earliest priority application in which the test standard appears.

Unless defined otherwise, technical and scientific terms used herein have the same meaning as is commonly understood by one of skill in the art to which this disclosure belongs.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A vehicle vision sensor system comprising:

at least one vision sensor having a housing defining a void and a sensing element disposed within the void, a voltage controlled heating element including a plurality of resistive heating coils with each resistive heating coil being wrapped around the housing, a local temperature and humidity sensor disposed exterior to and proximate the housing and the local temperature and humidity sensor being configured to sense a temperature and relative humidity within the void; and a controller in communication with the local temperature and humidity sensor and an outside air temperature sensor, the controller including a memory storing instructions for causing the controller to perform a process of identifying a dew point within the void, comparing a temperature of the void to the dew point and supplying a voltage to the voltage controlled heating element in response to the temperature of the void being below the dew point;

wherein comparing a temperature of the void to the dew point and supplying the voltage to the voltage controlled heating element in response to the temperature of the void being below the dew point comprises identifying a difference between a dew point of the void and a temperature of the void and determining a magnitude of the voltage based on the difference.

2. The vehicle vision sensor system of claim 1, wherein the at least one vision sensor is at least one of a light ranging and detection (LiDAR) sensor, a radio ranging and detection (RADAR) sensor, and a camera.

3. The vehicle vision sensor system of claim 1, wherein the sensing element includes a camera, a light ranging and detection (LiDAR) sensor, and a radio detection and ranging (radar) sensor.

4. The vehicle vision sensor system of claim 1, wherein the voltage controlled heating element is not in direct contact with the sensing element.

5. The vehicle vision sensor system of claim 1, wherein a magnitude of the voltage is actively controlled dependent on the difference between a dew point of the void and a temperature of the void.

6. The vehicle vision sensor system of claim 1, wherein the magnitude of the voltage is determined using a look up table stored in the controller.

7. The vehicle vision sensor system of claim 1, further comprising at least one display in communication with the controller and configured to display a condensation reduction system status of the at least one vision sensor.

8. The vehicle vision sensor system of claim 1, wherein the at least one vision sensor comprises a plurality of vision sensors, each sensor in the plurality of vision sensors including a corresponding sensing element disposed within the void, a corresponding voltage controlled heating element wrapped around the corresponding housing, and a corresponding local temperature and humidity sensor disposed proximate the housing and configured to sense a temperature and relative humidity within the void.

9. The vehicle vision sensor system of claim 8, wherein the controller is configured to control each vision sensor in the at least one vision sensor independently.

10. A method for preventing condensation within a vehicle sensor comprising:

comparing a measured internal temperature of the vehicle sensor to a dew point of the vehicle sensor by identifying a difference between a dew point of a void within the vehicle sensor and a temperature of the void and providing a voltage to a voltage controlled heating element of the vehicle sensor in response to an internal temperature of the vehicle sensor being less than the dew point of the vehicle sensor, wherein a magnitude of the voltage is dependent on the difference between the dew point of the void and the temperature of the void; and wherein the vehicle sensor includes a housing defining the void and a sensing element disposed within the void, a voltage controlled heating element including a plurality of resistive heating coils with each resistive heating coil being wrapped around the housing, a local temperature and humidity sensor disposed exterior to and proximate the housing and the local temperature and humidity sensor being configured to sense a temperature and relative humidity within the void.

11. The method of claim 10, further comprising identifying the dew point of the vehicle sensor using one of a temperature and humidity sensor disposed immediately adjacent to the vehicle sensor and a temperature and humidity sensor disposed on the vehicle sensor.

12. The method of claim 10, wherein the voltage controlled heating element is a resistive heating wire wound around a housing of the at vehicle sensor.

13. The method of claim 10, wherein a magnitude of the voltage is actively controlled dependent on the difference between a dew point of the void and a temperature of the void.

14. The method of claim 10, wherein the magnitude of the voltage is set using a look up table correlating the magnitude of the voltage with a magnitude of the difference.

15. The method of claim 10, wherein the vehicle sensor is at least one of a light ranging and detection (LiDAR) sensor, a radio ranging and detection (RADAR) sensor, and a camera.

16. The method of claim 10, wherein the voltage controlled heating element is not in direct contact with the vehicle sensor.

17. The method of claim 10, further comprising displaying a condensation reduction system status of the vehicle sensor, wherein the condensation reduction system status includes an internal temperature of the vehicle sensor.

18. The method of claim 10, further comprising comparing a measured internal temperature of a plurality of vehicle sensors to corresponding dew points in a plurality of dew points and supplying a voltage to corresponding heating element in response to a magnitude of a difference between each temperature and each corresponding dew point.

19. The method of claim 18, wherein each vehicle sensor in the plurality of vehicle sensors is controlled independently.

20. A vehicle comprising:

a vision system comprising a plurality of vision sensors disposed about a vehicle, each vision sensor in the plurality of vision sensors in communication with a controller;

at least one vision sensor of the plurality of vision sensors having a housing defining a void and a sensing element disposed within the void, a voltage controlled heating element wrapped around the housing, a local temperature and humidity sensor disposed exterior to and proximate the housing and configured to sense a temperature and relative humidity within the void; and the controller being in communication with the local temperature and humidity sensor and an outside air temperature sensor, the controller including a memory storing instructions for causing the controller to perform a process of identifying a dew point within the void, comparing a temperature of the void to the dew point identifying a difference between a dew point of the void and a temperature of the void and supplying a voltage to the voltage controlled heating element in response to the temperature of the void being below the dew point wherein a magnitude of the voltage is dependent on the difference between the dew point of the void and the temperature of the void.

* * * * *